May 26, 1959　　　R. HEID ET AL　　　2,888,120
FRICTION CLUTCH SPRING ARRANGEMENT
Filed Oct. 22, 1956　　　　　　　　2 Sheets-Sheet 2

INVENTORS:
ROLAND HEID
KURT FÄDLER

United States Patent Office 2,888,120
Patented May 26, 1959

2,888,120
FRICTION CLUTCH SPRING ARRANGEMENT

Roland Heid and Kurt Fadler, Schweinfurt (Main), Germany, assignors to Fichtel & Sachs A.G., Schweinfurt (Main), Germany, a corporation of Germany Application October 22, 1956, Serial No. 617,333

Claims priority, application Germany November 16, 1955

2 Claims. (Cl. 192—68)

The present invention relates to an improved arrangement of the springs of friction clutches such as are used in automobiles and the like. More particularly, it relates to a novel clutch arrangement wherein the springs are protected from excessive heat due to friction.

In highly stressed friction clutches the elements directly participating in the friction, such as the pressure plate in plate clutches or the coupling members in centrifugal jaw clutches, reach very high temperatures. As a result, the springs adjacent to, surrounding, enclosing or connected to these elements are heated to temperatures so high that the resiliency of the springs is impaired.

While layers of heat resistant material such as asbestos can sometimes be inserted between the heat generating parts of the clutch and the springs in an effort to reduce heat conduction to the springs, this is not always possible because of the construction of the clutch. In one clutch construction the pressure plate which carries the friction lining is provided with projections for guiding the springs and for balancing purposes. The springs are arranged so that they enclose or encircle these projections and insulating layers thus cannot be provided. In other clutch constructions, compactness does not permit insertion of such layers, as for example in centrifugal clutches where the springs opposing engagement of the clutch are generally arranged within the centrifugal coupling members.

It is accordingly an object of the present invention to provide a friction clutch with means for preventing excessive heating of the clutch springs due to friction.

Another object of the invention is to provide thermal shielding for the clutch springs of friction clutches even when these springs surround or are embedded in the clutch elements which are heated directly during operation of the clutch.

A further object of the invention is to protect the springs of friction clutches from excessive heat through conduction and radiation without increasing the dimensions of the clutch.

These and other objects and advantages are realized in accordance with the present invention wherein the springs are shielded by cups which are interposed between the springs and those portions of the clutch which are heated to high temperatures during operation of the clutch. In addition, the cups are spaced from these clutch elements so as to define therewith an air space which eliminates heat transfer by conduction and minimizes heat transfer by radiation. The tension of the springs can be used to maintain the cups in their desired positions so that they will not slip during operation of the clutch and insulating material such as asbestos gaskets may be utilized to help maintain the spacing between the cups and the heated elements.

The invention will now be described more fully with reference to the accompanying drawings, wherein.

Figure 1:
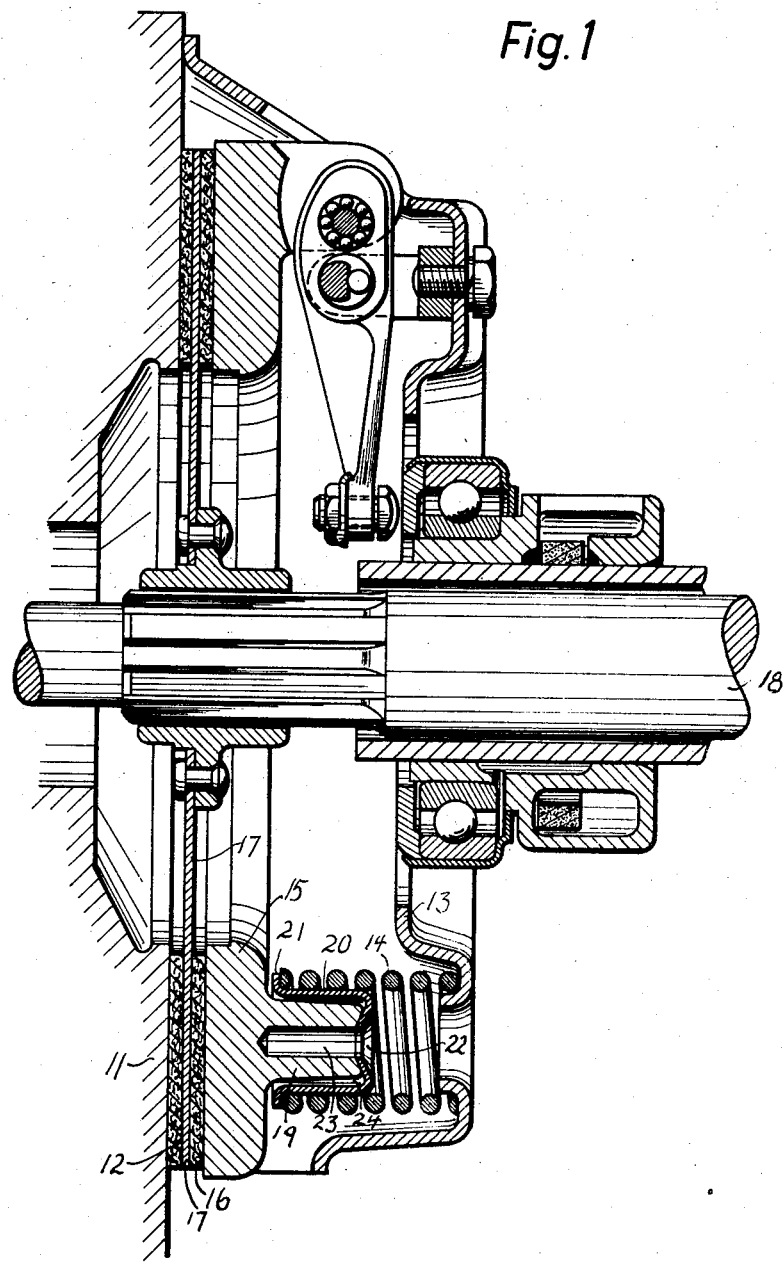
Fig. 1 is a section through a friction clutch in accordance with the present invention with the shaft shown in full.

Referring now more particularly to Fig. 1, the clutch is shown in engaged position. The flywheel 11 of the engine carries a friction lining 12 and is rotated by the engine together with casing 13. A clutch spring 14 of the helical compression type bears at one end against the casing 13 and the other end serves to urge pressure plate 15, carrying friction lining 16, to the left. Disc 17 is thus held between friction linings 12 and 16 and rotates together therewith. Since disc 17 is keyed to driven shaft 18, the shaft 18 also rotates.

Describing the cooperation between the clutch spring 14 and plate 15 in greater detail, the plate 15 also serves as a supporting member for at least one approximately cylindrical projection 19 which extends into and serves as a guide for the spring 14. A cup 20 seats on projection 19 and also extends into the spring 14 so as to separate the spring 14 from the projection 19. The cup 20 is provided with an outwardly turned lip or flange 21 against which the spring bears so that the spring pressure is transmitted through the cup 20 to the plate 15.

The base of the cup 20 conforms in contour to the corresponding end of projection 19 and a flat-headed screw 22 extends through an aperture in the cup into threaded engagement with a balancing bore 23 provided in the projection 19. The pressure of spring 14 bearing on flange 21, the contour of the bottom of cup 20 and the end of projection 19, and the bolt 22 all contribute to maintain the desired positioning of the cup 20 so that an air space 24 is defined between the cup 20 and projection 19. As a result, the heat which is conducted from pressure plate 15 to projection 19 during operation of the clutch is not transmitted to spring 14 due to the interposition of cup 20 and the air space 24, cutting off conduction and radiation.

Figure 2:
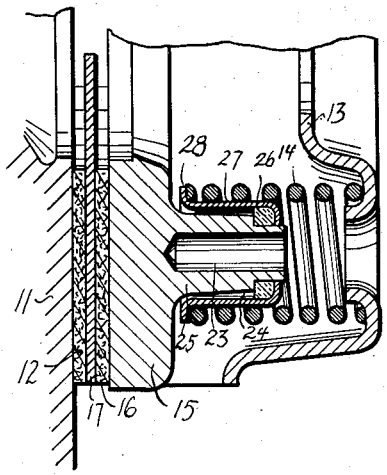
Fig. 2 is a section through a portion of a modified clutch.

The arrangement shown in Fig. 2 is generally similar to that of Fig. 1 but the projections 25 of pressure plate 15 are somewhat differently shaped. The end of each projection 25 is annularly shouldered to form a seat for a gasket or ring 26 of heat insulating material such as asbestos and cup 27 abuts against this gasket 26 for support by the free end of projection 25. The gasket 26, the seating of the cup 27 on the far end of projection 25, and the bearing of spring 14 on outturned flange 28 of cup 27 all contribute to center the cup on the projection and thereby maintain the air space 24.

Figure 3:
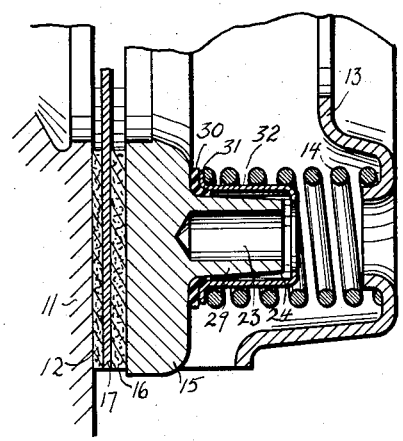
Fig. 3 is a section through a portion of another embodiment of a clutch.

In Fig. 3 the pressure plate 15 is provided with still differently shaped projections 29 and a specially shaped heat insulating gasket 30 seats about the base of projection 29 to provide an abutment for the flange 31 of cup 32, against which flange one end of the spring 14 bears.

Figure 4:
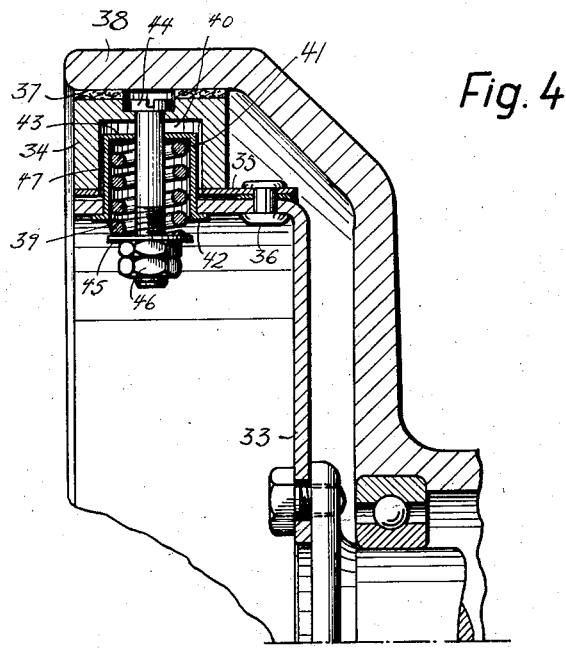
Fig. 4 is a section through a portion of a centrifugal clutch in accordance with the invention.

Fig. 4 shows the invention applied to a centrifugal clutch wherein a supporting member 33 is rotated by the crank shaft of the engine. A weight 34 is secured to a leaf spring 35 which in turn is riveted at 36 to member 33. As the rotational speed of the supporting member 33 increases, centrifugal force causes the weight 34 to be pivoted about rivet 36 so that friction lining 37 on weight 34 will bear against drum 38 which is connected with the driven shaft (not shown) and they will both be caused to rotate.

The clutch springs 39 determine the rotational speed at which engagement of the clutch will take place and they are operatively connected with the weights 34 in the following manner: The weight 34 is recessed at 40 to guide the compression spring 39. A cup 41 has an outwardly turned flange or lip 42 resting on supporting member 33 and an inwardly turned flange 43 at its other end within recess 40. The spring 39 is disposed within the cup 41 and at one end rests on flange 43.

A bolt 44 passes through the weight 34, through recess 40, past flange 43 and extends into the coiled spring 39. At the end of the bolt 44 a washer 45 is supported by nuts 46 and forms an abutment for the other end of spring 39. For weight 34 to pivot under centrifugal force it must of course overcome the tension on spring 39. This spring tension also serves to maintain the proper seating of the cup 41 and ensures provision of the air gap or space 47. The spring 39 is protected and shielded from the heated portion of weight 34 both by the cup 41 and the air space 47 which it defines with the weight.

The cup can conveniently be made from sheet steel or other metal. It can either be wholly out of contact with the supporting member or may merely contact selected portions thereof at a distance from that portion of the supporting member which is heated to high temperatures during operation of the clutch. In either event the air space which it defines serves to shield the clutch springs and thereby loss of resiliency of these springs is avoided. As clearly shown, the cups do not increase the space taken up by the clutch and their cost of manufacture and assembly is quite small.

Various changes and modifications may be made without departing from the spirit and scope of the invention as defined in the annexed claims.

What we claim is:

1. In a friction clutch comprising a clutch member which becomes heated during operation of the clutch, said clutch member being axially spring-pressed by a helical compression spring, the provision of a projection of circular cross-section fixed to said member and extending axially into said spring, and a cylindrical member having an outwardly turned flange at one end, the other end of said cylindrical member being supported by the free end portion of said projection, said cylindrical member extending longitudinally of said projection for substantially the entire length thereof, the inner walls of said cylindrical member being spaced from the sides of said projection to define a thermally insulative air space therebetween, said spring laterally surrounding said cylindrical member with one end of said spring pressing against said flange.

2. In a friction clutch according to claim 1, and wherein the free end portion of said projection is annularly shouldered, the further provision of an annular member formed of thermally insulative material seated on said shouldered portion of said projection, said other end of said cylindrical member engaging said annular member for support by said free end portion of said projection.

References Cited in the file of this patent

UNITED STATES PATENTS

| 2,002,841 | Tatter | May 28, 1935 |
| 2,060,773 | Pearmain | Nov. 10, 1936 |
| 2,068,579 | Tatter | Jan. 19, 1937 |
| 2,366,643 | Nutt | Jan. 2, 1945 |

FOREIGN PATENTS

| 951,844 | France | Apr. 18, 1949 |